(12) United States Patent
Pelant et al.

(10) Patent No.: US 9,377,524 B2
(45) Date of Patent: Jun. 28, 2016

(54) TIME SYNCHRONIZATION VIA OVER-DETERMINED MEASUREMENTS

(75) Inventors: Martin Pelant, Prague (CZ); Vojtěch Stejskal, Pardubice (CZ)

(73) Assignee: ERA A.S. (CZ)

( * ) Notice: Subject to any disclaimer, the term of this patent is extended or adjusted under 35 U.S.C. 154(b) by 882 days.

(21) Appl. No.: 13/445,609

(22) Filed: Apr. 12, 2012

(65) Prior Publication Data

US 2012/0265483 A1     Oct. 18, 2012

Related U.S. Application Data

(60) Provisional application No. 61/474,350, filed on Apr. 12, 2011.

(51) Int. Cl.
| | |
|---|---|
| *G01C 1/00* | (2006.01) |
| *G01S 5/06* | (2006.01) |
| *G01S 5/02* | (2010.01) |

(52) U.S. Cl.
CPC ........ *G01S 5/06* (2013.01); *G01S 5/0294* (2013.01)

(58) Field of Classification Search
CPC ............. G01S 1/00; G01S 1/02; G01S 1/022; G01S 1/024; G01S 1/026; G01S 1/04; G01S 1/042; G01S 1/045; G01S 1/08; G01S 1/20; G01S 5/00; G01S 5/0009; G01S 5/0018; G01S 5/0027; G01S 5/0036; G01S 5/0045; G01S 5/0063; G01S 5/009; G01S 5/02; G01S 5/0205; G01S 5/021; G01S 5/0242

USPC ............ 702/150, 151, 152, 153, 149, 89, 94, 702/189, 158; 342/118, 125, 385, 378, 386, 342/450, 463
See application file for complete search history.

(56) References Cited

U.S. PATENT DOCUMENTS

| | | | |
|---|---|---|---|
| 6,633,259 B1 | 10/2003 | Smith | 342/456 |
| 6,806,829 B2 | 10/2004 | Smith | 342/456 |
| 6,812,890 B2 | 11/2004 | Smith | 342/454 |
| 7,132,982 B2 | 11/2006 | Smith | 342/456 |
| 7,248,219 B2 | 7/2007 | Smith | 342/456 |
| 7,375,683 B2 | 5/2008 | Smith | 342/387 |
| 7,429,950 B2 | 9/2008 | Smith | 342/174 |

(Continued)

FOREIGN PATENT DOCUMENTS

EP      2107387 A2 * 10/2009

OTHER PUBLICATIONS

M. Pelant et al., "Multilateration system time synchronization via over-determination of TDOA measurements", *Proceedings of Tyrrhenian International Workshop on Digital Communications: Enhanced Surveillance of Aircraft and Vehicles*, Italy (Island of Capri), Sep. 12-14, 2011.
M. Pelant, "Estimate of Systematic Errors of a Passive Surveillance System (PSS) According to Emitters with Unknown Position", presented at the *German Radar Symposium GRS 2002*, Bonn, Germany, Sep. 3-4, 2002.

(Continued)

*Primary Examiner* — Elias Desta
(74) *Attorney, Agent, or Firm* — Ostrolenk Faber LLP (57) ABSTRACT

Disclosed are a method and a system for clock synchronization estimation using position over-determination principles applied to TDOA measurements of well-tracked targets with a height of about 5 km and higher. Clock correction factors or delays can then be applied to sensor clock signals, providing accurate tracking of targets such as aircraft, even in the event of GPS failure or jamming.

16 Claims, 8 Drawing Sheets

(56) References Cited

U.S. PATENT DOCUMENTS

| | | | |
|---|---|---|---|
| 7,437,250 B2 | 10/2008 | Breen | 702/24 |
| 7,477,193 B2 | 1/2009 | Evers | 342/126 |
| 7,495,612 B2 | 2/2009 | Smith | 342/450 |
| 7,570,194 B2 * | 8/2009 | Galati | 342/30 |
| 7,576,695 B2 | 8/2009 | Smith | 342/465 |
| 7,667,647 B2 | 2/2010 | Breen | 342/450 |
| 7,739,167 B2 | 6/2010 | Breen | 705/35 |

OTHER PUBLICATIONS

"Enhanced Surveillance of Aircraft and Vehicles—2011", *Tyrrhenian International Workshop on Digital Communications*, <http://radarlab.disp.uniroma2.it/esav11/main.htm>, Sep. 12-14, 2011.

U.S. Appl. No. 60/123,170, filed Mar. 5, 1999, Smith.

* cited by examiner

TIME SYNCHRONIZATION VIA OVER-DETERMINED MEASUREMENTS

CROSS REFERENCE TO RELATED APPLICATIONS

This application is based on and claims benefit of U.S. Provisional Application Ser. No. 61/474,350, filed Apr. 12, 2011, entitled TIME SYNCHRONIZATION VIA OVER-DETERMINED MEASUREMENTS, the contents of which are specifically incorporated herein by reference.

FIELD OF THE INVENTION

The present invention relates to synchronization of remote clocks. In particular, the present invention is directed toward a system and method for synchronizing remote clocks in a time difference of arrival (TDOA) tracking system.

BACKGROUND OF THE INVENTION

A number of systems for tracking vehicles, such as aircraft, using time difference of arrival (TDOA) techniques have been developed. The following U.S. Patents and Patent Applications, all incorporated herein by reference, disclose various aspects of TDOA tracking techniques:

U.S. patent application Ser. No. 11/545,800, filed Oct. 10, 2006;
U.S. patent application Ser. No. 11/492,711, filed Jul. 25, 2006;
U.S. patent application Ser. No. 11/429,926, filed on May 8, 2006;
U.S. patent application Ser. No. 11/343,079, filed on Jan. 30, 2006;
U.S. patent application Ser. No. 11/342,289 filed Jan. 28, 2006;
U.S. patent application Ser. No. 11/209,030, filed on Aug. 22, 2005;
U.S. patent application Ser. No. 11/257,416, filed on Oct. 24, 2005;
U.S. patent application Ser. No. 11/203,823 filed Aug. 15, 2005;
U.S. patent application Ser. No. 11/145,170 filed on Jun. 6, 2006;
U.S. patent application Ser. No. 10/743,042 filed Dec. 23, 2003;
U.S. patent application Ser. No. 10/638,524 filed Aug. 12, 2003;
U.S. patent application Ser. No. 09/516,215 filed Feb. 29, 2000;
U.S. patent application Ser. No. 60/123,170 filed Mar. 5, 1999;
U.S. patent application Ser. No. 10/319,725 filed Dec. 16, 2002;
Provisional U.S. Patent Application Ser. No. 60/440,618 filed Jan. 17, 2003.

In a Time Difference of Arrival tracking system, a radio signal (either generated by, or reflected from a target) may be received from the target at a number of receiving stations (e.g., three or more) and the time the signal (time stamp) is received, carefully measured at the receiving station. This time information for the signal may then be sent to a central processor which receives the time stamps from the various receiving stations, and from that data, can calculate with some precision, the location of the target (e.g., aircraft).

Accuracy of the system relies in part on the accuracy of the time-stamping technique. Each receiver has to have an accurate clock, or at least be accurate relative to the clocks of the other receivers. In the past, various solutions have been tried to provide the most accurate clock synchronization between receivers. For example, some systems utilize GPS clock signals from satellites in order to synchronize clocks between various receivers. Others may utilize a beacon with a known position, transmitting signals to various receivers. The receivers may then synchronize their local clocks, based on the apparent arrival time of the signal and the known position of the signal source.

However, there may be situations where a target or beacon of known position is not available for synchronizing remote clocks. For example, in a portable system, the location and distance of a known beacon may not be readily available. Alternately, there may be situations where master clock signals, such as so-called lighthouse beacons or GPS signals, are lost. In such a situation, position data for aircraft may be inaccurate until the clock signals can be re-established. Thus, a need exists in the Prior Art for a system whereby remote clocks can be synchronized without the need for a beacon or GPS signal, to provide accurate tracking for aircraft.

SUMMARY OF THE INVENTION

In the present invention synchronization of remote clocks is achieved from over determined TDOA measurements, rather than using GPS or a beacon/lighthouse with a known position. This synchronization has particular application to Multilateration (MLAT) with five or more stations, while its efficiency increases with the number of stations (it can be only four stations in case of beacon/barometric altitude). This condition is satisfied in case of Wide Area Multilateration (WAM) system.

The principle of synchronization is based on the assumption that all targets are tracked in real 3D space, and the fact that the vector of primary, linearly independent, TDOA pulse measurements of the target may have dimension strictly greater than three (rather than a real 3D space). The theoretical maximum dimension of TDOA pulse measurements vector is equal to the number of stations minus one. Then it clearly shows the condition of at least five sensors.

Synchronization via over-determination is based on the TDOA measurements of the target with unknown location of dimension four and higher. The synchronization algorithm is more complex than the procedure for processing TDOA measurements of satellites or ground based beacons.

Over-determined measurements for time synchronization may thus be used where time data from ground beacons and GPS receivers is not available. The main advantages are summarized as follows:

Synchronization is based directly on data that are used for targets' location, and thus does not need any additional hardware to be used for synchronization.

For the MSS with seven stations, it is theoretically sufficient to have only two properly situated targets with unknown location.

Errors in over-determined measurements are generally only caused by hardware used for target tracking, thus it synchronizes this hardware directly by virtue of targets. In the case of GPS receivers, an additional hardware is needed and ground beacons may be pursued separately by directional antennas.

Generally good visibility and spatial variability of airborne targets is required.

Over-determined TDOA measurements are drawn from real targets' measurements and therefore as the only source of signal allowing continuous estimation of TOA noise measurement, which is used for target tracking, depending on pulse amplitudes. These dependencies can be observed only for signals with different amplitudes.

The main disadvantages can be summarized as follows:

The quantity and quality of over-determined measurements depends on the density of air traffic and a common exposure of stations. However, in testing the present invention, the inventors made a simulation on real traffic and found out that even weak night traffic is sufficient for time sync.

A specific problem is the current weather situation, but due to spatial variability of targets and the fact that all signal paths are not at ground level, the situation is better than for beacon techniques. However, the influence of the atmosphere is greater than the spread of the GPS signal.

DETAILED DESCRIPTION OF THE INVENTION

Wide Area Multilateration (WAM) systems use for their sensors' synchronization a Distributed Time (DT) or Central Time (CT) principle. This means implementation of a time reference into side stations when using Distributed Time, which is usually in the form of GPS Common View equipment. Such a system requires only minor levels of systematic time error corrections on a Central Processing Station (CPS). Incoming trains are already time stamped (TOA) on each station. On the other hand, Central Time uses only one time reference implemented at the CPS. TOA stamping is performed at the CPS to which are all pulse trains are forwarded from side stations. The targets' Time Difference of Arrival (TDOA) is then computed at the CPS.

Both time synchronization principles are more or less affected by systematic errors of TDOA measurements. The main challenge in such system design and deployment is its systematic error reduction (e.g. systematic errors of additional time delays in a CT system) which can be called "calibration". The synchronization/calibration method is based on the fact that the area of primary TDOA measurements has a dimension greater than three, thus greater dimensions than the real 3D space. A special case occurs when any time reference is missing (i.e. GPS in DT). In this case, the system can be synchronized/calibrated only from one source respectively from real traffic TDOA measurements with targets of unknown position. There exist two different means of calibration.

The first calibration technique performs time calibration from over-determined TDOA measurements with known behavior in height. The minimal operational requirements are four stations and one independent source with height measurement (this can also be a ground beacon). A second calibration technique performs time calibration from over-determined TDOA measurements of targets with an unknown position. The minimal system requirement is five stations.

Both of these calibration methods may be applicable only to the WAM systems. The preferred embodiment of the present invention is directed toward the second case of time synchronization/calibration. The systematic time errors (of additional delays) together with their accuracy (covariance matrix) and current estimate of clock deviations (TDOA deviations) can be then estimated.

In one test of the present invention illustrated herein, real traffic from two WAM systems, namely Brno and Ostrava (in the Czech Republic), were taken for the purposes of synchronization algorithm design and evaluation. The Brno system includes seven stations. The synchronization method was then evaluated on the basis of a Kalman filter which estimates clock deviations from over-determined TDOA measurements at stations 2-7 from the reference clock at station 1. For evaluation purposes, a random number generator generates "real" mutual deviations of clocks on each station which tends to slowly diverge without any synchronization, which corresponds to the real clock behavior. The Kalman filter contains a state vector (current estimate of clock deviations), including its accuracy (covariance matrix) computed from measurements. The difference between "real" clock deviation (from the clock at station 1) and estimated deviations produced by synchronization measurements, which can be found in the status vector, is the key result description. That difference corresponds to systematic errors from primary WAM TDOA measurements and affects all tracked targets.

Note that stations that are close in position to other stations are synchronized much more accurately than other pairs. This effect is caused by the small weight of TDOA coordinates from the base between stations in the calculation of the target position, when a relatively large change in 3D position of the target causes only a small change in TDOA coordinates.

Figure 1:
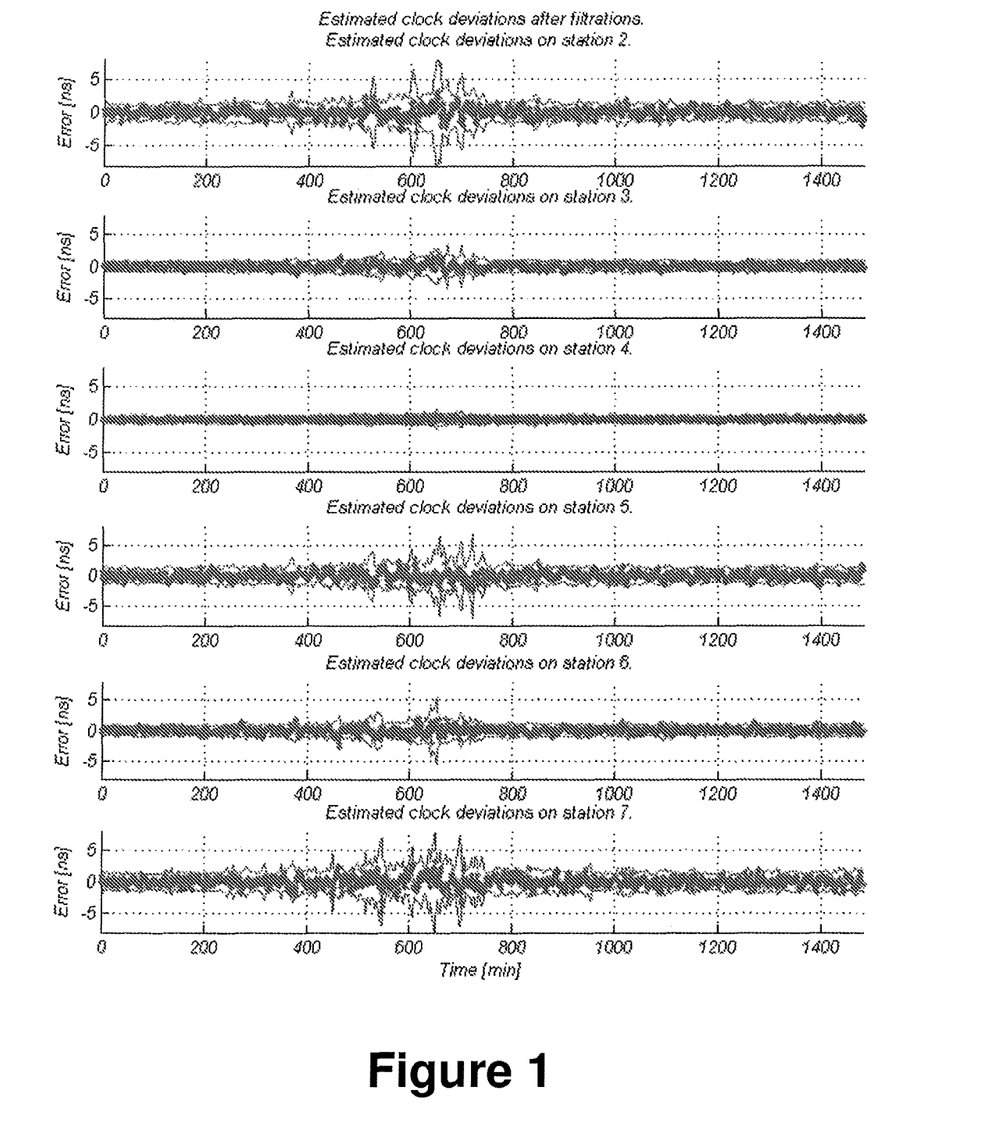
FIG. 1 is a series of graphs illustrating systematic errors of TDOA measurements on sensors 2-7, relative to sensor 1 (not shown) of WAM Ostrava during the worst time period for synchronization estimated by over-determination method, where the y axis represents clock deviation in nanoseconds, and the x axis represents time in minutes.

FIG. 1 is a series of graphs illustrating systematic errors of TDOA measurements on sensors 2-7, relative to sensor 1 (not shown) of WAM Ostrava during the worst time period for synchronization (e.g., least amount of traffic) estimated by the determination method, where the Y-axis represents clock deviation in nanoseconds, and the X-axis represents time in minutes. The graphs of FIG. 1 illustrate the systematic errors of primary WAM TDOA measurements where clock synchronization on each sensor is based only on real traffic conditions. The graph elements represent progress of systematic errors and the continuous solid portion "lock up" corresponds to the theoretical limit of 99% percentile. These errors can be interpreted as error for a fixed station after application of the over-determination method. Thus, output data from a fixed station will be affected by this error during given time interval. Stations close to each other produce smaller errors which are given by their geometrical arrangement in space.

Figure 2:
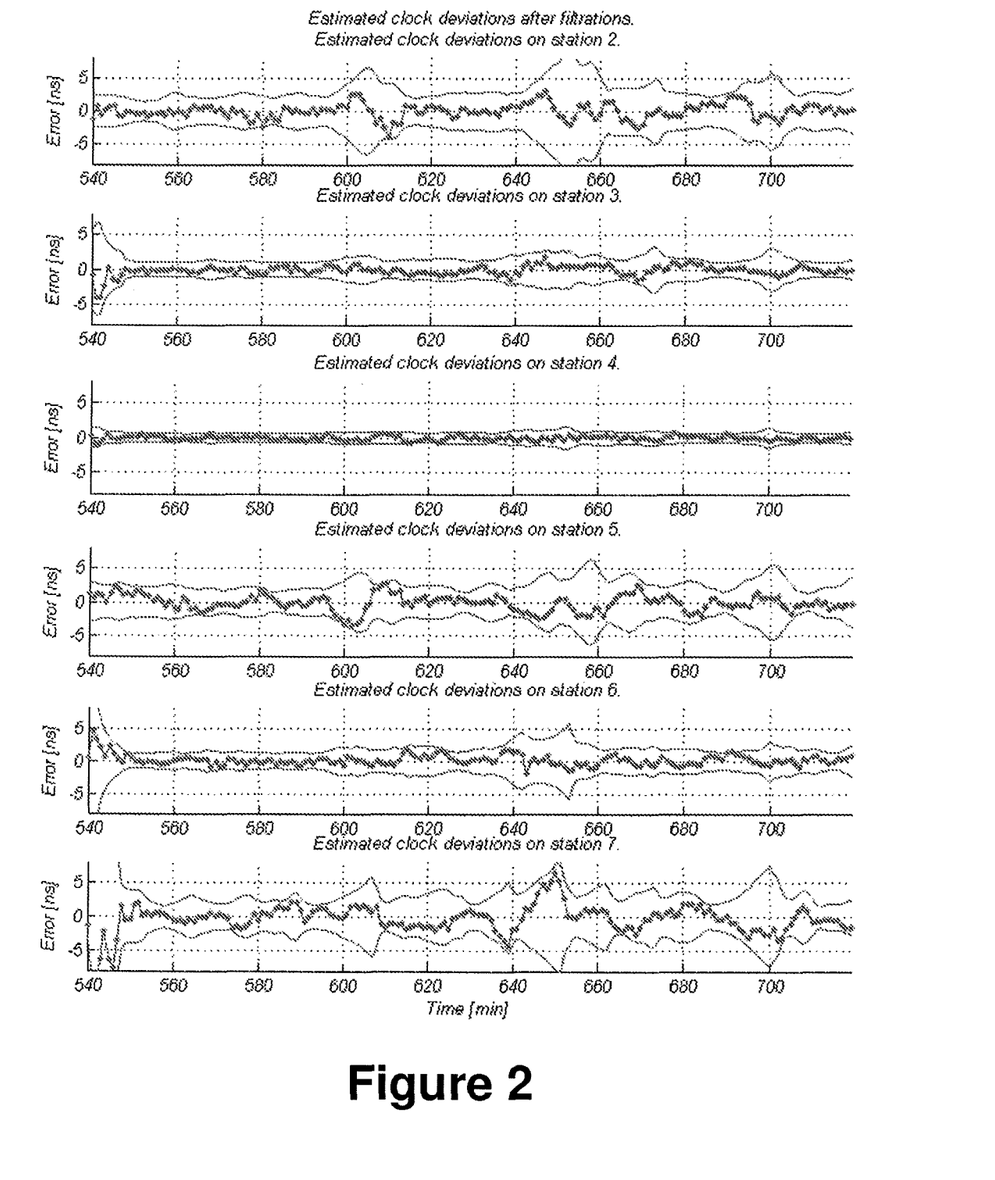
FIG. 2 is a series of graphs derived from the data illustrated in FIG. 1, showing individual data points and the overall data envelopes.

FIG. 2 is a series of graphs derived from the data illustrated in FIG. 1, showing individual data points and the overall data envelopes. FIG. 2 is essentially a cutout from FIG. 1, namely the weak synchronization during night traffic. Referring to FIG. 2, one can see the TDOA measurement error dependency on traffic density at any given time.

Figure 3:
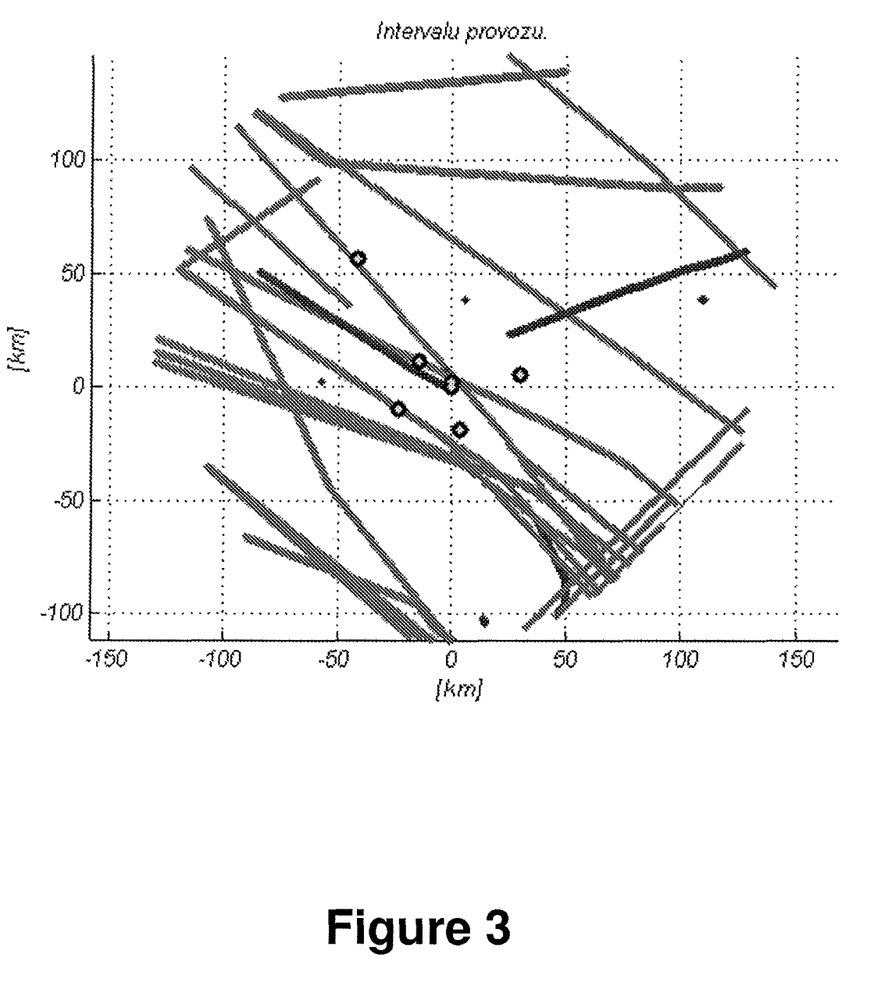
FIG. 3 is a graph illustrating target tracks in two dimensions (x and y axes both being in kilometers) where the circular dots represent the location of the seven stations and the dark trajectories represent lower altitude targets (aircraft) while the lighter trajectories represent higher altitude targets.

FIG. 3 is a graph illustrating target tracks used in generating the data in FIGS. 1 and 2, in two dimensions (X- and Y-axes both being in kilometers). The circular dots represent the location of the seven stations. The traffic illustrated was from a worst time period for synchronization by the over-determination method (from Aug. 30, 2010, 1 AM until Aug. 30, 2010, 2 AM) where traffic was at a minimum. The dark trajectories represent lower altitude targets (aircraft) while the lighter trajectories represent higher altitude targets. Only the lighter (higher altitude) trajectories were used for synchronization, as accuracy in obtaining synchronization from lower level targets is far more difficult, if not impossible, in some situations.

Figure 4:
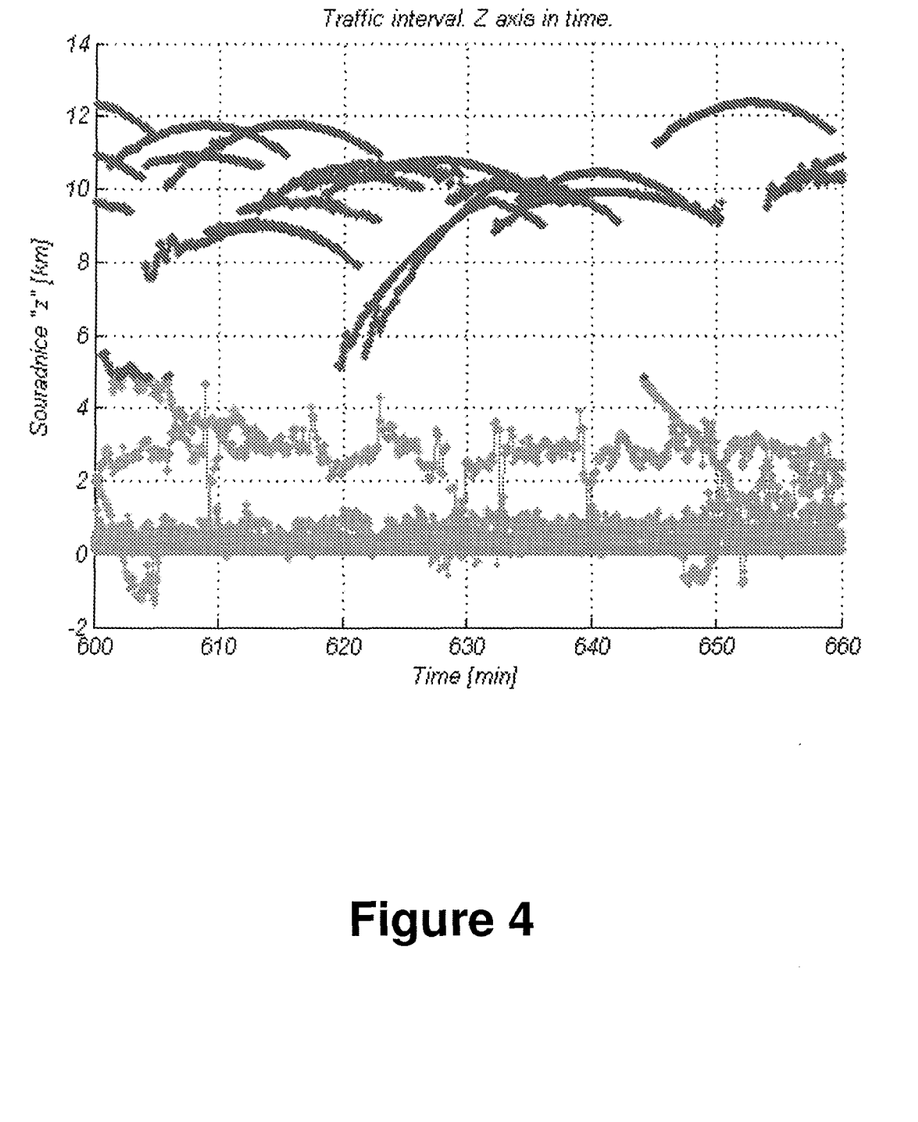
FIG. 4 is a graph illustrating the target altitudes, over time, during the worst hour of system operation during the test, in terms of synchronization, where dark lines represent lower altitude targets (aircraft) while the lighter lines represent higher altitude targets.

FIG. 4 is a graph illustrating the target altitudes, over time, during the worst hour of system operation during the test, in terms of synchronization. Again, The dark lines represent lower altitude targets (aircraft) while the lighter lines represent higher altitude targets. As illustrated in FIG. 4, only targets with an altitude of 4800 meters and above were used for generating synchronization using over-determination.

The testing of the system of the present invention illustrates that the synchronization system from TDOA simulated from real data will be able to perform well and keep a tracking system operating for a sufficient time, at least until all aircraft within tracking range have landed at an airport. The present invention was developed in response to a need by airports to have an option for aircraft tracking if no GPS signal was available in a distributed system, in order to keep the aircraft tracking system keep running for at least a half-hour, and land all airplanes safely. Such a GPS outage could be the result of local jamming, worldwide outage, or the like.

Over-determination has been used in the Prior Art for calibrating overall systems and finding errors. An example of such a technique is disclosed in the paper *Estimate of Systematic Errors of A Passive Surveillance System (PSS) According to Emitters with Unknown Position* (Pelant), presented at the German Radar Symposium GRS 2002, Bonn, Germany, 3-4 Sep. 2002 and incorporated herein by reference. However, the technique has not, to the best of the inventor's knowledge, been used to synchronize clocks on separate tracking stations.

In operation, the invention uses the previously reported known position, for example, the preexisting position prior to GPS failure, and/or the ADS-B signal, mode-C, or Barometric height (e.g., altitude mode-C transponder). This position data may be only an approximate location of the aircraft, since the data may not be accurate, or the aircraft has moved since the last position reporting. The position of the aircraft is then calculated a number of times using the Time Difference of Arrival (TDOA) measured from a number of tracking stations, preferably five or more, even though the clocks of the different tracking stations may be slightly out of sync. Time Difference of Arrival and Wide Area Multilateration are described in the Prior Art previously incorporated by reference.

To calculate an initial position in three dimensions, at least four reporting stations may be needed. Or, if altitude is known (barometric reporting from a Mode-C transponder, for example) only three reporting stations may be needed to determine an initial position. In either event, the over-determination technique calculates aircraft position based on different groups of receivers within the overall set. Thus, in the simplest example for a group of four sensors, S1, S2, S3, and S4, the position of an aircraft or other object may be determined by using time-stamp signals from different groups of three sensors. For example, a first position may be determined from S1, S2, S3 sensors, a second position from S1, S2, S4 sensors, a third position from S1, S3, S4 sensors, a fourth position from S2, S3, S4 sensors. Thus, a number of different position values (and thus track values) can be readily calculated.

By merging this position data together, discrepancies in reporting station clock signal values can then be calculated, by determining, iteratively, the clock corrections necessary to cause all of the position values to correspond to one another. The same technique can be used in three dimensions using five or more sensors, grouped into groups of four. In the test data above, seven sensors were used, with the data plotted relative to the one sensor S1 (whose plot would show a straight line).

In a "lighthouse" arrangement, known in the Prior Art, a transmitter of known position may be used, with a clock signal received by the multiple sensors. Such a lighthouse arrangement may also be used in the present invention, where numerous position values may then be calculated using different groupings of sensors, and then the clock values adjusted iteratively to produce corrected clock offsets based on the known position of the "lighthouse" transmitter. However, such an arrangement represents only a special case of the present invention, which can calibrate clock signals from all sensors in a system using actual moving targets, without the need for a "lighthouse" transmitter of known location. In some applications, e.g., mobile applications, such a "lighthouse" may not be available, and thus the techniques of the Prior Art would not work. The present invention, in contrast, does not require the use of a "lighthouse" beacon of known position, although the present invention could be adapted to such an embodiment. However, Prior Art lighthouse techniques have not be adapted to using moving targets of unknown position, as in the present invention.

Figure 5:
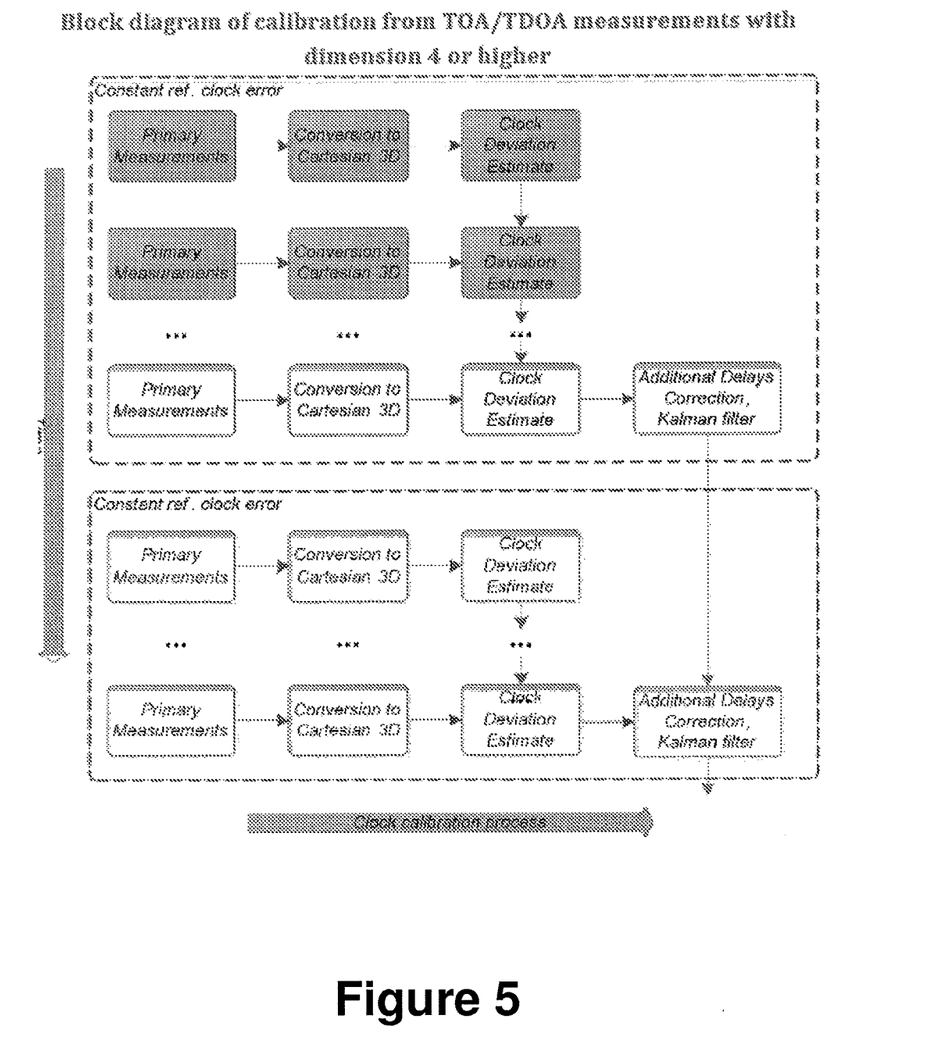
FIG. 5 is a block diagram of the system of the present invention.

FIG. 5 is a block diagram illustrating the system of the present invention for calibration of TOA/TDOA measurements of dimension 4 or higher. The block diagram of FIG. 5 illustrates the iterative process (X axis) over time (Y axis). Referring to FIG. 5, a number of primary measurements are made of the position of a target, using different groups of sensors, as previously discussed. These positions are then converted to Cartesian 3-D coordinates, and when compared to other such measurements, a clock deviation estimate is made. From these clock deviation estimates, additional delays or corrections to clocks are made, using a Kalman filter, and the process is repeated. With each iteration, the position data becomes more coherent, and the clock values are brought into sync using the correction factors. Note that while not shown in FIG. 5, the 3D Cartesian coordinates are converted back to hyperbolic coordinates and then compared to the primary measurements which are in hyperbolic coordinates.

The Primary Measurements are computed as follows: Any TDOA measurements with dimensions equal or higher than four may be used in this example. The following processing can be sped up if the primary measurements are supplemented by corresponding approximate target's position in 3D which can be taken from the prior target tracking process. This will omit analytical conversion from the three selected TDOA measurements into Cartesian 3D. Analytical conversion provides only an approximate position estimate which serve as initial condition for iterative computation of real 3D position, exploiting a whole vector of primary measurements.

Conversion from hyperbolic to Cartesian 3D space is computed as follows. An approximate or initial target's position in 3D can be computed from primary TDOA measurements via analytical conversion or can be updated through primary measurement (dimension 4 or more) associated with an existing tracked target. This block computes the most probable target position (from TDOA) in 3D space according to whole vector of primary measurements and its regular covariance matrix defining position accuracy. A simple method for converting hyperbolic values into a Cartesian coordinate system would be to update the position of the emitter/target based on values obtained through tracking the emitter/target which is well known.

Afterwards, it computes the difference between the most probable target position in 3D (estimated in previous steps and converted back to hyperbolic space) and entering primary TDOA measurements (from whole set of primary measurement vectors). This difference is estimate of inferior clock deviations (additional delays) with singular covariance matrix.

The difference, including the probability matrix, can be computed by the fact that dimensions of primary TDOA measurements (in hyperbolic space) are higher than dimensions of 3D (Cartesian), i.e., 3D space is subspace of primary measurement (hyperbolic) space. The system is thus over-determined (redundant).

Figure 8:
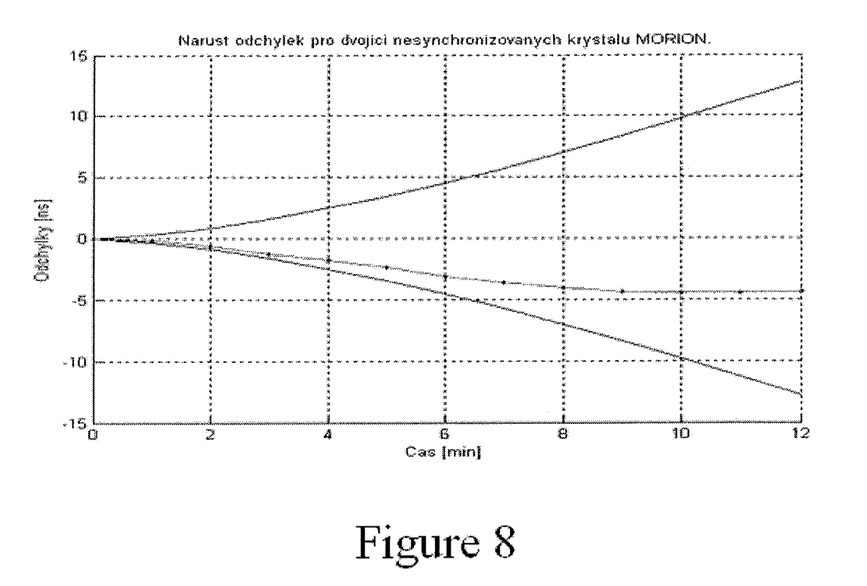
FIG. 8 graphically shows an example of clock deviations as a function of time in minutes.

The Clock Deviation Estimate is calculated as follows. Coalescence of one-minute consequent differences, mentioned above, are made between measured and the most probable target's position in hyperbolic space, i.e., estimated correction of the clocks' additional delays. Every measurement may vary in a coordinate system and it is necessary to have one unified measurement, to which all measurements are transformed. All differences are accumulated into one multi-dimensional Gaussian value. Additional delay errors (reference clocks' deviations at stations) are assumed to be constant during this approximately one-minute period. Note that coalescent estimates of differences may comprise the final calibration output in some applications, depending on the accuracy level desired and the amount of initial discrepancy in the clock values between stations. In short, a mean value is obtained from all the estimations which will be used as a final correction. It should be noted that the cycle is not necessarily exactly one minute. Rather, the cycles is approximately one minute during which clocks on sensors can be considered as constant/stable (without deviation). FIG. 8 illustrates deviations between two MORION crystals (clocks). X is time in minutes Z is deviations in ns. The middle curve is the mean value. As shown, significant deviations occur after about the one minute point.

Correction of Additional Delays and the Kalman filter operate as follows. Update (or correction) of additional delays (reference clock errors) uses Kalman filter features, which allows the system to model the error trend of an additional delay (error of clock synchronization). Clock errors are then filtered.

Thus, to summarize, systematic clock errors occur partly after conversion of the primary measurements from hyperbolic coordinates to 3D Cartesian coordinates and remain there, and partly in the TDOA difference after conversion back from 3D Cartesian coordinates to hyperbolic coordinates. The conversion of the 3D Cartesian coordinates to TDOA primary measurements produces different components of systematic error in hyperbolic space, i.e. it produces time corrections for the stations.

These delay values may be applied to the sensor clock values (time stamps) as received at a central station, where time-stamped data values are received from a number of receivers to perform TDOA calculations to determine aircraft position. Alternately, these time delay values may be transmitted to sensor stations to correct or update sensor clock signals. In either event, the position signals may be continually over-determined in order to verify that the clock signals remain accurate over time and to update or revise the clock correction factors.

In this manner, a WAM system can be kept in operation even without a centrally synchronized clock signal, through the means of over-determination techniques. Such a system and method is important, as modem aircraft tracking systems are switching over to an ADS-B (Automatic Dependent Surveillance) type system, where GPS position signals are self-reported by aircraft to determine aircraft positions in a controlled airspace. If GPS signals go offline or are jammed, position of aircraft would be difficult to determine, unless legacy radar systems were still employed. Wide Area Multilateration offers a backup solution to ADS-B, but may also be dependent on a GPS clock signal for synchronization purposes. The present invention allows an WAM system to operate in the absence of a central synchronized clock signal, thus providing an effective redundant backup to ADS-B systems.

Figure 6:
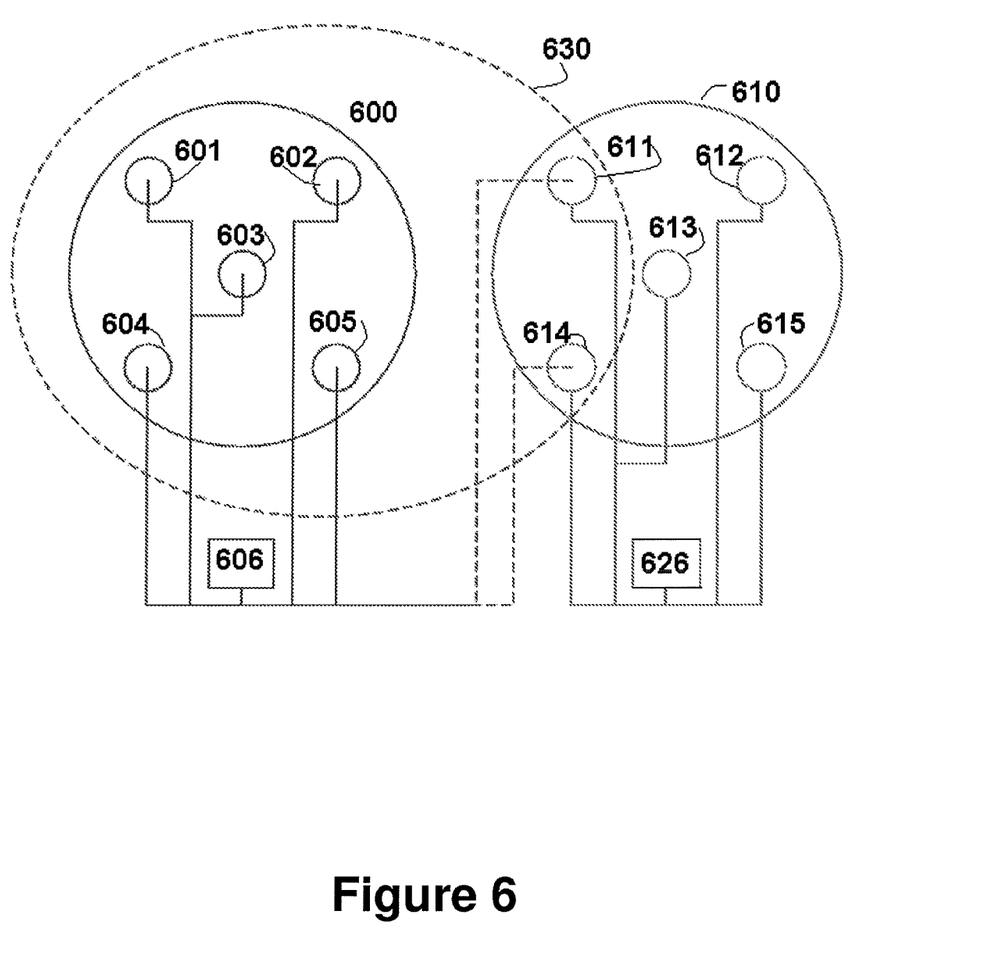
FIG. 6 is a simplified block diagram of two WAM systems synchronized together in one embodiment of the present invention.
Figure 7:
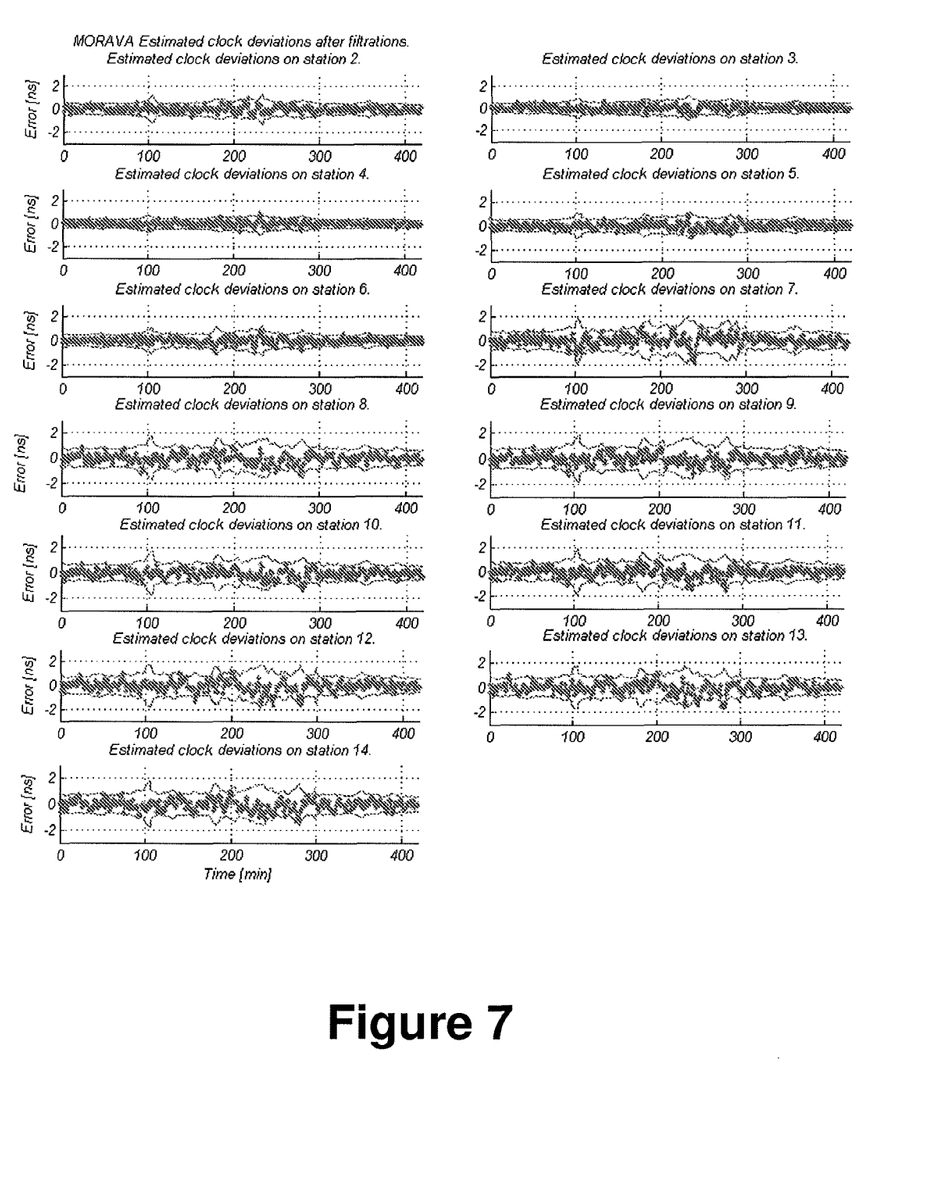
FIG. 7 is a series of graphs illustrating a simulated synchronization of two WAM systems together.

Note also that the technique of the present invention may also be applied to synchronize clocks on multiple overlapping WAM (Wide Area Multilateration) systems. FIG. 6 is a simplified block diagram of two WAM systems synchronized together in one embodiment of the present invention. FIG. 7 is a series of graphs illustrating a simulated synchronization of two WAM systems together.

Referring to FIG. 6, on the right hand side of the diagram is an existing WAM system which may comprise a Central Time (CT) type system. Circles 611, 612, 613, and 614 represent receivers (stations), while the rectangle 626 represents the Central Processing Station (CPS). The outer circle 610 represents schematically, the coverage area for this first WAM system. The left side of the diagram illustrates a new WAM system, which may comprise a Distributed Time (DT) type system, installed adjacent to the existing system and close enough to see some of the same aircraft. Circles 601, 602, 603, and 604 represent receivers (stations), while the rectangle 606 represents the Central Processing Station (CPS). The outer circle 600 represents schematically, the coverage area for the second new WAM system.

If the TOA data from at least some of the receivers (e.g., 611 and 614) of the first system were provided to the CPS 606 of the second system, as indicated by the dotted line, then the coverage of the second system would be increased to the area represented schematically by the dashed circle 630. However, normally this would not be possible as the CT system receivers data is unsynchronized. This may be resolved in the Prior Art by adding a converter to the CPS 626 of the CT system that provides the same synchronization mechanism as the DT system. However, using the method of the present invention, this synchronization problem may be solved without this converter just by observing a commonly visible aircraft within area 630.

Note that in practice, CT data Time of Arrival (TOA) is measured centrally so it would be the TOA data from CPS 626 that would be passed to the second CPS 606. However if a different sync method were used, the data might go directly from the first set of receivers 611, 614, for example, where a GPS sync system and a transponder sync system are used.

Referring to FIG. 7, a simulation was made, using data from two WAM systems Brno and Ostrava, together (in the Moravia region of the Czech Republic). As they are overlapping, you will obtain some tracks twice which allows both systems to synchronized to each other. In the example of FIG. 7, data from 14 stations were used; stations 1 to 7 from the WAM Brno system, and stations 8 to 14 from the W AM Ostrava system. As the whole synchronization process becomes more over-determined the level of synchronization produced is better as seen in FIG. 6. The clock synchronization error and its 99% percentile did not exceed 2 ns in the worst night traffic case, and thus provided an acceptable level of synchronization.

There is also the option to synchronize one system by another overlapping system using the positions of known targets. These targets have to be detectable from an unsynchronized system. For example, the Brno WAM system is unsynchronized but overlapping with the Prague WAM system, which is internally synchronized. A common target for both systems may then produce a beacon which increases the level of over-determination and also significantly reduces synchronization error in Brno WAM system because of its known position.

Pelant, M., Stejskal, V. *Multilateration system time synchronization via over determination of TDOA measurements*, published in Proceedings of Tyrrhenian International Workshop on Digital Communications: Enhanced Surveillance of Aircraft and Vehicles. Italy (Island of Capri): 12-14 Sep. 2011 (incorporated by this reference) includes disclosure that may further help a skilled person understand the scope and the benefits of the present invention.

While the preferred embodiment and various alternative embodiments of the invention have been disclosed and described in detail herein, it may be apparent to those skilled in the art that various changes in form and detail may be made therein without departing from the spirit and scope thereof.

What is claimed is:

1. A method for determining a location of an emitter, comprising:
    acquiring, in a Wide Area Multilateration (WAM) system that includes a central processing station and a plurality of reporting stations, a time-stamp value from at least an N number of reporting stations each reporting station being configured to receive an emitted signal from an emitter and to transmit a time-stamp signal containing a time stamp value, each reporting station being associated with a respective clock, and the clocks of said reporting stations being in an unsynchronized state;
    calculating, with a processor, a plurality of position values each position value being indicative of a possible position of said emitter based on said time-stamp values of at least N−1 of said reporting stations, each position value being calculated based on time-stamp values from a unique group of N−1 of said plurality of reporting stations;
    calculating, with a processor, clock deviations of said station clocks based at least on the plurality of position values;
    correcting, with a processor, said time-stamped values based on the calculated clock deviations; and
    determining, with a processor, a location of said emitter based on said corrected time-stamp values.

2. The method of claim 1, wherein N is at least five.

3. The method of claim 1, wherein at least one of said reporting stations is a transponder providing part of a position and N is at least four.

4. The method of claim 1, wherein said clock deviations are calculated based on iteratively determining corrections necessary to cause said position values to correspond to one another.

5. The method of claim 1, wherein said clock deviations are calculated by a) converting primary time difference of arrival (TDOA) measurements from hyperbolic coordinates to Cartesian coordinates; b) estimating the most probable Cartesian position values; c) converting the most probable position values to hyperbolic coordinates to obtain TDOA estimates; and d) comparing the hyperbolic coordinates of the primary TDOA measurements to TDOA estimates to determine their differences.

6. The method of claim 5, wherein said time stamp values are corrected using a filter.

7. The method of claim 5, repeating said a) step to said d) step.

8. The method of claim 6, wherein said filter is a Kalman filter.

9. The method of claim 1, wherein said position values are calculated based on time difference of arrival measurements.

10. The method of claim 1, wherein said time-stamp values are corrected at the central processing station.

11. The method of claim 1, wherein said time-stamp values are corrected at said reporting stations.

12. The method of claim 11, further comprising transmitting correction values to each said reporting station to correct its clock value.

13. The method of claim 1, wherein said location of said emitter is determined based on time difference of arrival.

14. The method of claim 1, wherein said clock deviations are calculated by a) converting primary time difference of arrival (TDOA) measurements from hyperbolic coordinates to Cartesian coordinates; b) estimating the most probable Cartesian position values; c) converting the most probable Cartesian position values to hyperbolic coordinates to obtain TDOA estimates; d) comparing the hyperbolic coordinates of the primary TDOA measurements to TDOA estimates to determine clock correction values; e) repeating steps a) to d) periodically for a period of time during which clock deviations are assumed to be constant; and f) adding clock correction values into one multidimensional (N−1) Gaussian function to obtain clock corrections.

15. The method of claim 14, further comprising g) filtering out clock corrections.

16. The method of claim 14, wherein said period of time during which clock deviations are assumed to be constant is one minute.

* * * * *